United States Patent [19]

Baugh

[11] 4,112,781
[45] Sep. 12, 1978

[54] ROTATIONAL SPEED REDUCTION AND REVERSING MECHANISMS

[76] Inventor: Benton F. Baugh, 14626 Oak Bend, Houston, Tex. 77079

[21] Appl. No.: 704,030

[22] Filed: Jul. 9, 1976

[51] Int. Cl.² .................... F16H 13/04; F16H 17/02; F16H 17/00
[52] U.S. Cl. ........................................ 74/198; 74/190
[58] Field of Search ................... 74/198, 190, 207

[56] References Cited

U.S. PATENT DOCUMENTS

| | | | |
|---|---|---|---|
| 1,141,508 | 6/1915 | Weiss | 74/198 |
| 1,146,982 | 7/1915 | Weiss | 74/198 |
| 1,537,515 | 5/1925 | Weiss | 74/198 |
| 1,541,882 | 6/1925 | Weiss | 74/198 |
| 1,602,514 | 10/1926 | Weiss | 74/198 |
| 2,682,776 | 7/1954 | Morgan | 74/198 |
| 2,959,971 | 11/1960 | Salomon | 74/198 |

FOREIGN PATENT DOCUMENTS

| | | | |
|---|---|---|---|
| 1,108,955 | 1/1956 | France | 74/198 |
| 1,245,647 | 10/1960 | France | 74/198 |
| 1,210,646 | 2/1966 | Fed. Rep. of Germany | 74/198 |

Primary Examiner—Samuel Scott
Assistant Examiner—William R. Henderson

[57] ABSTRACT

A rotational speed reduction and reversing mechanism wherein power is input thru a hollow spherical shell and taken out thru relative small rollers mounted in a perpendicular fashion on the circumference of an output rotor. The axis of the output rotor is rotated relative to the axis of the input spherical shell to vary the rotational speed reduction ratio.

5 Claims, 6 Drawing Figures

ROTATIONAL SPEED REDUCTION AND REVERSING MECHANISMS

The object of this invention is to provide a speed reduction mechanism capable of infinitely variable, positive ratio speed reduction over a range from 1:1 to 1:0 in a first direction; and infinitely variable, positive ratio speed reduction over a range from less than 1:1 to 1:0 in the reverse direction.

BACKGROUND OF THE INVENTION

The present invention relates to rotational speed reduction and reversing mechanisms.

Prior speed reduction mechanism fall generally into three general categories: positive finite ratio, positive infinite ratio, and non-positive ratio types.

Positive finite ratio types generally have fixed gears for speed reducers which give a specific speed reductional ratio. Examples of this are manual automobile transmissions where a clutch can be used to selectively pick one of several available gear ratios by engaging one of several sets of gears, and automobile automatic transmissions where each set of gears is provided with its own clutch for automatic gear ratio selection.

Positive infinite ratio types could be illustrated by variable pulley width belt drives. In this case as the width of the pulley on each end of the belt is varied, an infinitely variable ratio is obtained. However, the variable ratio is obtained only over a small range normally in the range from 1:2 to 2:1. This type mechanism cannot approach the 1:0 type rotational speed reductions or any type of directional reversals.

Non-positive ratio types such as fluid clutches are of a highly inefficient quality and are not closely related to the present invention.

The virtue of the present invention is that it provides a positive ratio rotational speed reduction and reversal which is infinitely variable and therefore provides capabilities which are not available from any other mechanism. In addition to providing features not presently available from current products the present invention is comprised of significantly fewer parts than many of the present products and should therefore be significantly less expensive to manufacture.

This invention possesses many other advantages, and has other purposes which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense.

DETAILED DESCRIPTION OF THE PREFERRED EMBODIMENT

Figure 1:
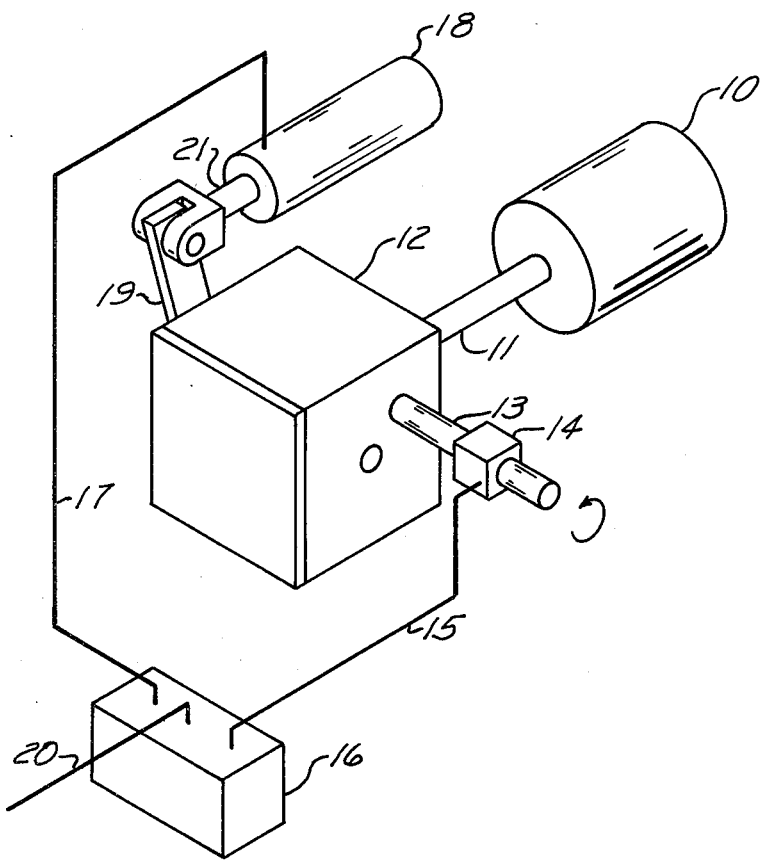
FIG. 1 is a schematic representation of the rotational speed reduction mechanism in a complete system illustrating automatic ratio changes in response to multiple input signals.

Referring to the drawings and in particular FIG. 1, a complete system utilizing this invention is shown. A power supplying member 10 such as an internal combustion engine or electric motor is connected by a shaft 11 to the rotational speed reduction mechanism 12. The output power exits from the rotational speed reduction mechanism 12 by way of the output shaft 13. A speed measuring device 14 is mounted on the output shaft 13 and feeds information by way of the connecting cable 15 to the control means 16. The control means 16 is programmed to receive the input from the connecting cable 15 and any additional inputs required as typlified by the additional connection 20 and subsequently to send signals down the connection 17 to cause the cylinder means 18 to move in accordance with the aforementioned program. The cylinder means 18 is attached by a suitable connecting rod 21 to a shifting lever 19 for the purpose of moving the shifting lever 19 through preselected positions according to the aforementioned program according to the signals from the control means 16.

Figure 2:
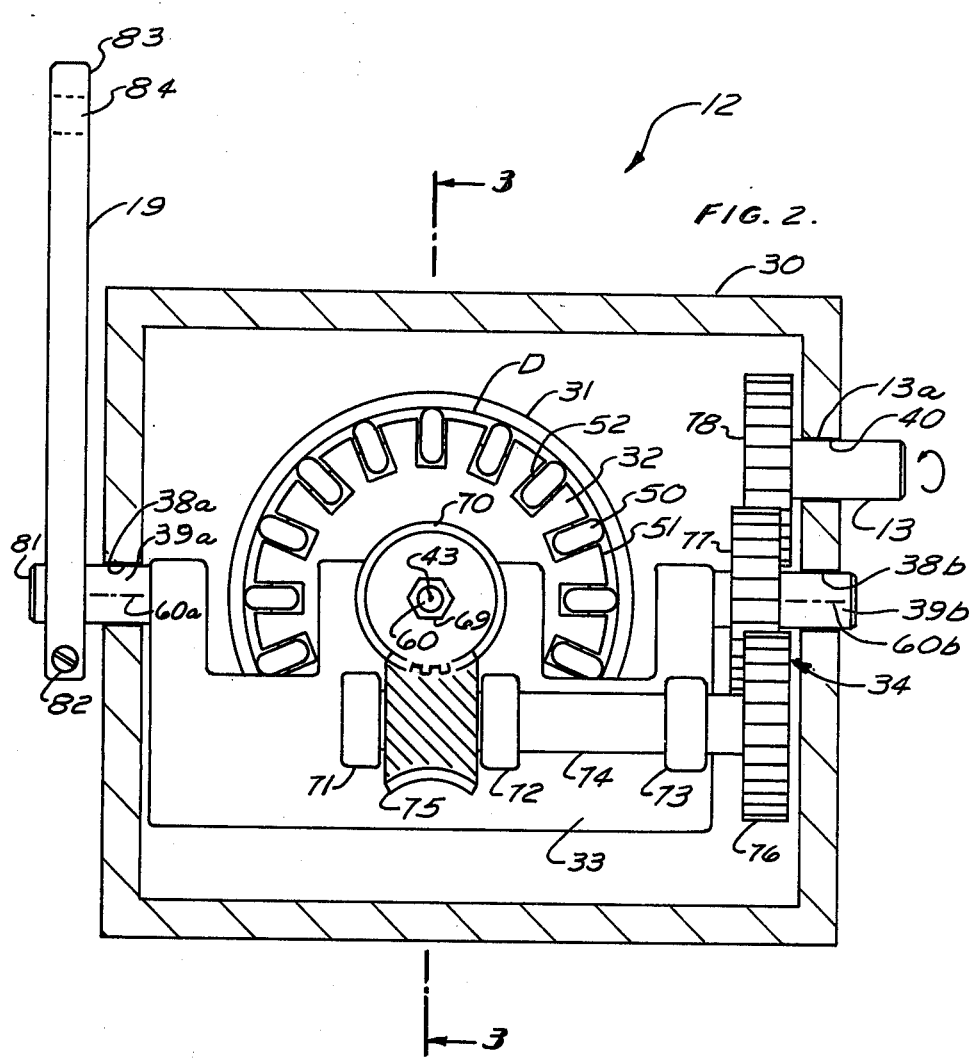
FIG. 2 is a cross section of the rotational speed reduction mechanism showing the basic internal parts.
Figure 3:
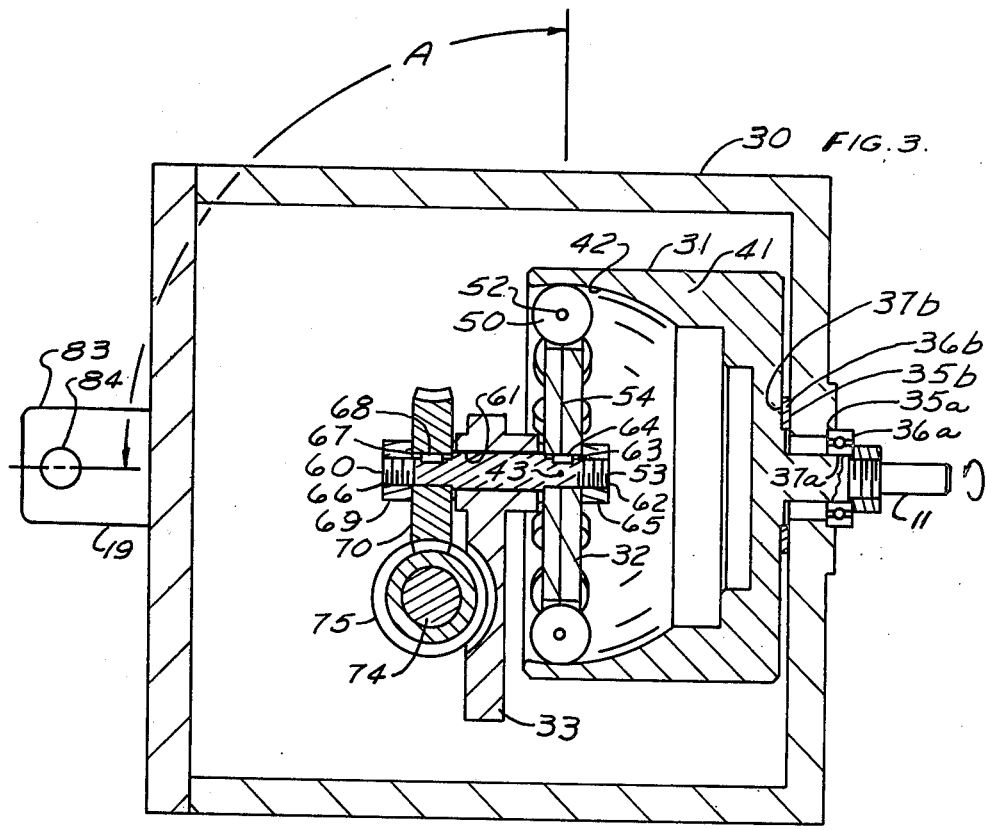
FIG. 3 is a cross section taken along the line 3—3 of FIG. 2 illustrating a rotational speed reduction ratio of approximately 1:1.

The rotational speed reduction mechanism 12 is illustrated in detail in FIGS. 2 and 3. The mechanism 12 generally consists of a housing 30, an internally spherical input means 31, hereafter called the input means, an output rotor 32, a rotor mounting means 33, and an output gear train 34. The housing 30 provides bearing surfaces 35a and 35b which support and align the bearings 36a and 36b which in turn support and align the surfaces 37a and 37b on the input means 31 for smooth rotational operation. The housing 30 provides bearing areas 38a and 38b for mating with the external surfaces of rotor mount shafts 39a and 39b. The housing also provides a bearing support area 40 for support and guidance of the output shaft 13 on the output shaft bearing area 13a.

The input means 31 provides bearing support surfaces 37a and 37b for mating with the bearings 36a and 36b, an input shaft 11 for receiving power from the aforementioned power supplying member 10, and a cylindrical section 41 with an inner spherical surface 42. The inner spherical surface 42 is most efficiently constructed when the spherical surface 42 actually present extends toward the input shaft portion of the input means 31 to a greater extent than to the opposite direction, relative to the spherical center 43 of the inner spherical surface 42.

The output rotor 32 is a flat circular member with multiple rollers 50 mounted about its circumference 51. These rollers 50 are mounted to roll freely about axles 52 which are mounted so as to lay parallel to the plane of the rotor 54 and perpendicular to the axis 53 through the center of the rotor 32. The rollers 50 are mounted so as to contact the spherical surface 42 as the rotor 32 turns. The rollers 50 are numerous enough such that when they are evenly spaced around the circumference 51 of the rotor 32 that the circumferential distance between two of the rollers will be less than the width of the spherical surface 42.

The rotor mounting means 33 is constructed such that the center of rotation 60a and 60b through the rotor mount shafts 39a 39b passes through the spherical center 43 of the inner spherical surface 42. Additionally the rotor mounting means 33 supports the rotor 32 in such a way that the plane of the rotor 54 and the axis of the rotor 53 coincide at the spherical center 43 of the inner spherical surface 42. Further the rotor mounting means 33 supports the rotor 32 in such a way that the coincidence of the plane of the rotor 52 and the axis of the rotor 54 will remain at the spherical center 43 of the inner spherical surface 42 while the rotor mounting means 33 and therefore the rotor 32 is pivoted about the rotor mount shafts 39a and 39b.

The rotor mounting means 33 provides two rotor mount shafts 39a and 39b for pivotable support and alignment of the rotor mounting means and therefore the rotor 32 itself. A rotor mounting axle 60 is mounted for low friction rotation within the bearing surface 61 within the rotor mounting means 33. This axle provides a thread 62, a keyslot 63, a key 64, and a threaded nut 65 on one end for mounting the rotor 32 in the position as mentioned above. The opposite end of the rotor mounting axle 60 provides a thread 66, a keyslot 67, a key 68, and a threaded nut 69 for mounting an output bevel gear 70. Bearing blocks 71, 72, and 73 are provided by the rotor mounting means 33 to freely support the axle 74, which in turn supports suitable gears to transmit power away from the output rotor bevel gear 70. Intermediary bevel gear 75 performs the function of receiving the power from output bevel gear 70 and delivering it at approximately 90° to the axle 74. The axle 74 delivers the power to spur gear 76, which in turn delivers it to spur gear 78, which in turn delivers it to the output shaft 13. Spur gear 76 is mounted on the axle 74 with a rigid connection as is common in the industry. Intermediary spur gear 77 is mounted in a freely turning fashion on the shaft 39b. Main output spur gear 78 is rigidly fixed to the output shaft 13.

The exact nature of the speed measuring device 14, the connecting cable 15, the control means 16, the connection 17, the cylinder means 18 and the connecting rod 21 will vary to a large extent depending on the application in which this device is being used. If this device were to be used as an automobile transmission, the speed measuring device 14 could be very similiar to the speed control devices presently in use to keep automobiles at a constant speed on the highway. These present devices monitor the rotation of the speedometer cable and control an air cylinder on the accelerator linkage to keep the automobile at a constant speed. Full descriptions of the current type systems are described in the service manuals of most new cars.

The control means 16 on an automobile automatic transmission of this new type would receive inputs on the actual speed of the car and the intake manifold vacuum pressure to select the optimum operating ratio at any given time.

Lever 19 is attached to the end 81 of the rotor mount shaft 39a by tightening down of the screw 82 to obtain a locking type effect. End 83 of the lever 19 provides a suitable mounting hole 84 for the attachment of the connecting rod 21 shown in FIG. 1. Angular movement of the lever 19 will in turn cause a similiar angular movement of the rotor mounting means 33 and the output rotor 32.

FIG. 3 shows the rotor 32 in a position in which one revolution of the input shaft 11 would result in one revolution of the output rotor 32. Assuming that there is a 1 to 1 ratio between the output bevel gear 70 and the bevel gear 75, the input revolutions per minute and the output revolutions per minute would be identical.

Figure 4:
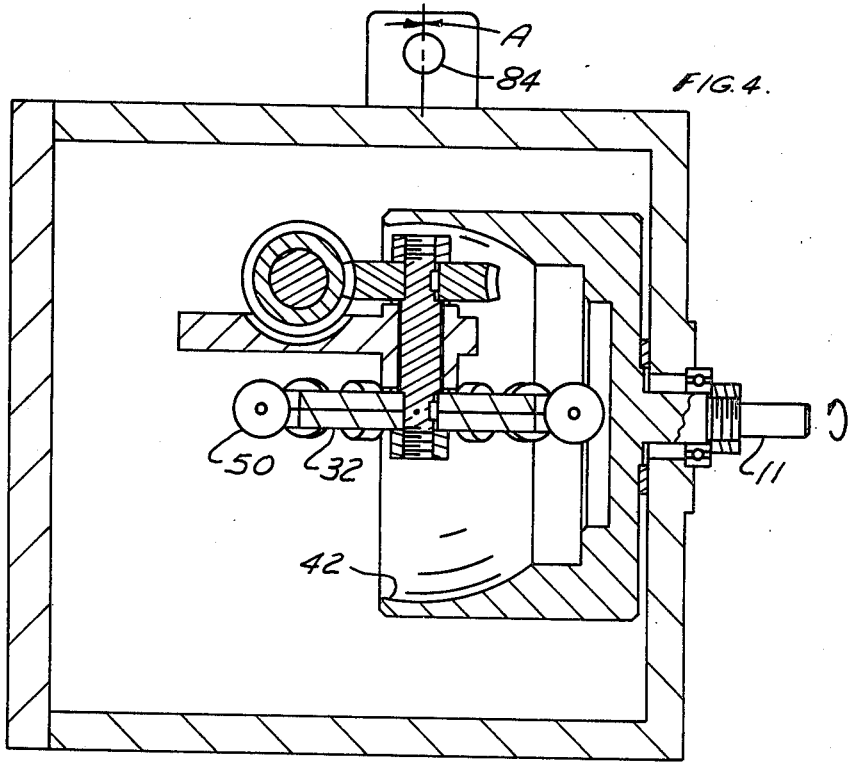
FIG. 4 is a view similiar to FIG. 3 except showing a rotational speed reduction ratio of 1:0.

FIG. 4 shows the output rotor 32 in a position at 90° from that shown in FIG. 3. In this position the rollers 50 on the output rotor 32 are free to rotate without moving the output rotor itself when the spherical surface 42 is rotated by the rotation of the input shaft 11. As a result of this when the input shaft 11 is rotated, the output shaft will remain stationary. This becomes the equivalent of a clutch being disengaged on a normal speed reduction mechanism.

Figure 5:
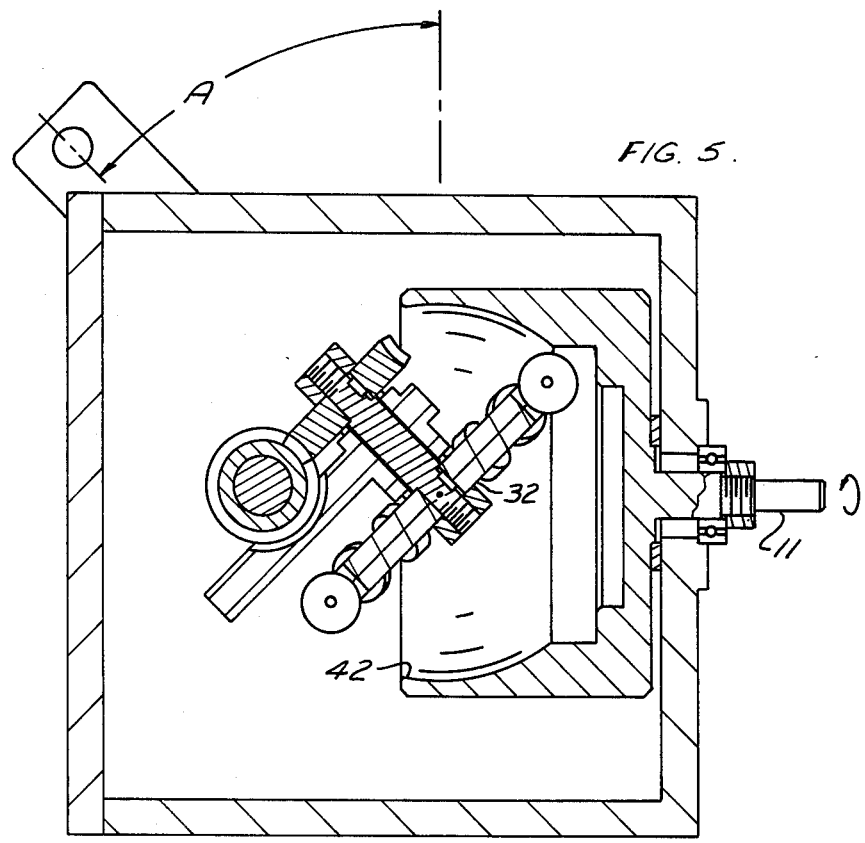
FIG. 5 is a view similiar to FIG. 3 except showing a rotational speed reduction ratio somewhere between 1:1 and 1:0.

FIG. 5 shows the output rotor 32 in a position somewhere between the two positions shown in FIG. 3 and FIG. 4. In this position as the inner spherical surface 42 is rotated by the input shaft 11 rotation, the output rotor 32 is urged to move at a rotational speed greater than zero, but less than that of the input shaft 11. By pivoting the angle of the output rotor 32 as measured by A, the relative rotational speed of the output rotor 32 in reference to the rotational speed of the input shaft 11 can be varied. The rotational speed of the output rotor can be determined by the equation:

$R = I\sin(A)$ Where: $R$ = rotational speed of the output rotor 32 $I$ = rotational speed of the input shaft 11 $A$ = angle as shown on the drawing.

As a result of this type of relationship between these rotational speeds it becomes obvious that the speed reduction ratio is infinitely variable, and that very high reduction ratios are available as the angle A becomes close to zero degrees. This type speed reduction mechanism is readily adaptable to applications such as automobile transmissions replacing both clutch and gear type relationships.

Figure 6:
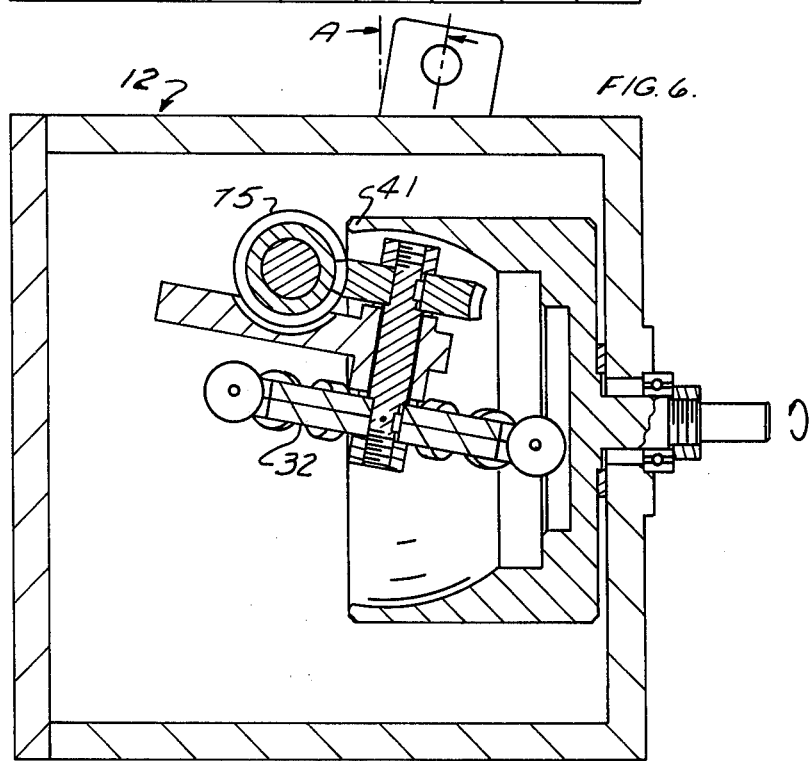
FIG. 6 is a view similiar to FIG. 3 except showing a rotational speed reduction ratio somewhere between 1:0 and 1:1 in the reverse direction.

FIG. 6 shows the speed reduction mechanism 12 when the output rotor has been moved past the position of zero degrees as measured by the angle A. In this position the rotation of the output rotor 32 is reversed relative to the rotation of the input shaft, thereby demonstrating the ability of this type speed reduction mechanism to not only provide infinitely variable speed reduction in a first direction but also to provide a limited amount of speed variation in the opposite direction, with the input shaft always rotating in the same direction. The limit on how far in the negative direction the angle A can go is determined by the interference of the bevel gear 75 with the cylindrical section 41.

I claim:

1. A rotational speed changing mechanism comprised of: a first rotating member with an internal spherical surface mounted for rotation; a second rotating member mounted for rotation with a plurality of rollers spaced around its circumference; said rollers mounted to turn about their individual axis and to contact the internal spherical surface of the first member in such a manner that the second member may rotate on the internal surface of the first member; a housing provided with mounting means for pivoting the second member in relation to the first member and near the center of rotation of the first member; said second member pivotably mounted on said housing so as to rotate about an axis in such a fashion as to maintain contact between one or more of said rollers on the second member and the spherical internal surface of the first member; and an output gear train provided to allow the output drive axis of the second member to be rotated about the pivoting axis of the mounting means while also allowing the power output of the rotational speed changing mechanism to be set off at a 90° angle to the power input.

2. A rotational speed changing mechanism as disclosed in claim 1 with mounting means for the second member, said mounting means located between two opposing pivot points on opposite sides of the housing such that the second member drive output is mounted for rotation on said mounting means and allowed to pivot around the axis of the pivot points.

3. A rotational speed changing mechanism as disclosed in claim 14 with an output gear train such that there is a beveled output gear on the output shaft of the second member in driving connection and at a right angle to an intermediary bevel gear and axle and output spur gear mounted on the pivoting mounting means such that the intermediary bevel gear, axle, and output spur gear pivot contemporaneously and in continual driving connection with the output bevel gear on the drive shaft of the second member.

4. An output gear train as disclosed in claim 3 where the pivoting output spur gear is in driving connection with a freely mounted intermediary spur gear mounted on one end of the pivoting mounting means, inward of the housing pivot point, said intermediary spur gear in driving connection with a main output spur gear and output shaft.

5. An output gear train as disclosed in claim 4 such that when the second member is pivoted about the pivoting axis of the mounting means, the intermediary bevel gear, axle, and output spur gear pivot contemporaneously with the second member and orbit circumferentially about the freely mounted intermediary spur gear and in driving connection with said spur gear and main output spur gear and output shaft.

* * * * *